Oct. 16, 1956 A. H. SAMPERMANS 2,766,723
LAYING NEST
Filed Oct. 11, 1954
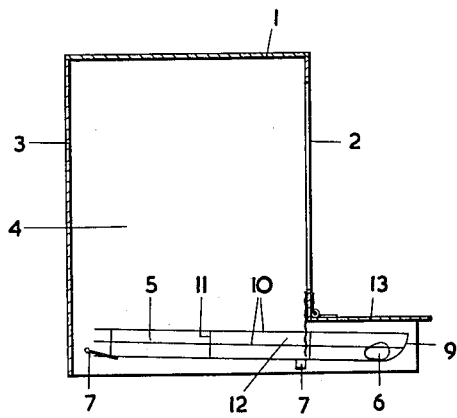
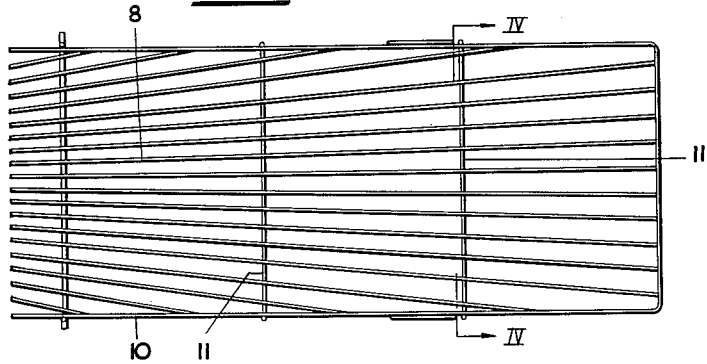
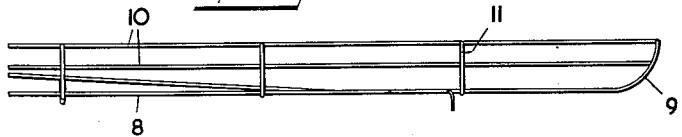
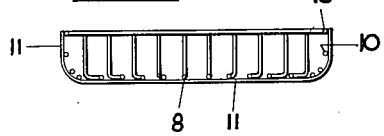
INVENTOR.
ADOLPHE HUBERT SAMPERMANS
BY
Wenderoth, Lind & Ponack
Attys.

United States Patent Office 2,766,723
Patented Oct. 16, 1956

2,766,723

LAYING NEST

Adolphe Hubert Sampermans, Simpelveld, Netherlands

Application October 11, 1954, Serial No. 461,562

2 Claims. (Cl. 119—48)

The present invention relates to a laying nest having an egg-collecting place connected therewith, the bottom of said nest being constructed as a removable whole formed by a plurality of wires or rods downwardly inclined from the laying place to the egg-collecting place.

In the known laying nests of this type said wires or rods are parallel to one another. The resultant disadvantage is that eggs laid in succession will all roll from the laying centre in the same direction to the egg-collecting place, so that there is a fair chance of the eggs running against each other which will often result in cracked eggs and in addition in an accumulation of eggs at one point, so that the eggs will remain within the reach of the hens.

The invention has for its object to eliminate this disadvantage.

To that end the laying nest according to the invention is characterized in that the wires or rods diverge in such a manner that tracks for carrying away the eggs are formed, which tracks spread away from the laying centre in the form of a fan. Thus a good distribution of the eggs over the collecting place is obtained and the chance of the eggs cracking is greatly reduced. In addition the inclination of the rods or wires required for making the eggs roll away from the laying centre is smaller in this laying nest than in case parallel rods or wires are used, because the eggs upon travelling downwards will sink deeper and deeper between the diverging rods or wires.

The bottom of the laying nest and egg-collecting place according to the invention is formed as a whole, so that it can easily be mounted in existing laying houses.

The invention will be described hereinafter with reference to the accompanying drawing, showing a preferred embodiment of the laying nest according to the invention.

In said drawing:

Figure 1 is a side elevation view, partly in cross section, showing a laying nest with the laying nest tray according to the invention shown therein;

Figure 2 is a plan view of the laying nest tray and egg-collecting place according to the invention;

Figure 3 is a side view thereof and

Figure 4 is a section on the line IV—IV in Figure 2.

The laying nest comprises a casing 1 with an entrance 2 for the hen, a rear wall 3 and side walls 4. The inclined laying nest tray 5 formed integral with the egg-collecting place 6 is detachably hooked into notches and bears on supports 7 of the side walls 4, so as to make it easily removable in its entirety.

The laying nest tray and egg-collecting place is composed of a plurality of resilient rod-like bottom members 8, made e. g. from metal or a synthetic material, which rod-like bottom members diverge in the direction from the laying centre to the egg-collecting place to form rolling tracks for the eggs, which tracks spread out in the shape of a fan, so that the displacement of the eggs towards the egg-collecting place is promoted, while at the same time an automatic distribution of the eggs over the egg-collecting place is obtained. The end-wall 9 of the egg-collecting place is formed by the extensions of the rod-like bottom members 8, so that also said end-wall is resilient. The change-over between the end-wall and the tray is rounded off, because the wires or rods are bent upwardly, the radius of curvature being at least equal to that of the section of a normal egg.

The laying nest tray and egg-collecting place has side walls formed by longitudinally extending wires or rods 10, the wires or rods forming said side walls being so arranged that also the connection between the side walls and the tray is rounded off. The wires and rods which together form the laying nest tray and egg-collecting place are kept together by transverse members 11 with which they are connected by welding, soldering or in any other suitable manner. The laying nest tray is so positioned that the egg-collecting place extends beyond the casing and is accessible from the outside for collecting the eggs via a hinged lid 13 which at the same time serves as a jumping board for the hen entering the laying nest. Furthermore a yielding opaque curtain, as designated by the numeral 12 in the drawing, is provided between the laying centre and the egg-collecting place.

I claim:

1. In a laying nest an elongated laying nest tray having a bottom and sides positioned to slope downwardly from the laying nest to the egg collecting place outside the nest, said tray comprising a plurality of longitudinally extending rod-like bottom members diverging outwardly from the nest toward the egg collecting place.

2. The improvement as claimed in claim 1 in which said bottom members are resilient.

References Cited in the file of this patent

UNITED STATES PATENTS

| | | |
|---|---|---|
| 1,329,963 | Faust | Feb. 3, 1920 |
| 2,176,814 | Hawkins | Oct. 17, 1939 |
| 2,512,861 | Hill | June 27, 1950 |